Inventor: Walter W. Brindley

UNITED STATES PATENT OFFICE.

WALTER WILLIAM BRINDLEY, OF PASADENA, CALIFORNIA.

PORTABLE RABBIT-CAGE.

1,267,625.

Specification of Letters Patent.   Patented May 28, 1918.

Application filed August 21, 1917.   Serial No. 187,365.

*To all whom it may concern:*

Be it known that I, WALTER WILLIAM BRINDLEY, a subject of the King of Great Britain, residing at Pasadena, in the county of Los Angeles and State of California, have invented certain new and useful Improvements in Portable Rabbit-Cages, of which the following is a specification, reference being had therein to the accompanying drawing.

This invention relates to a portable rabbit breeding or grazing cage, the object of the invention being to provide a device of this character embodying improved means for raising and lowering a grazing cage, and for establishing communication between the cage and rabbit house, the said device being transportable from place to place in a ready and convenient manner.

The invention consists of the features of construction, combination and arrangement of parts hereinafter fully described and claimed, reference being had to the accompanying drawing, in which:—

Figure 1:
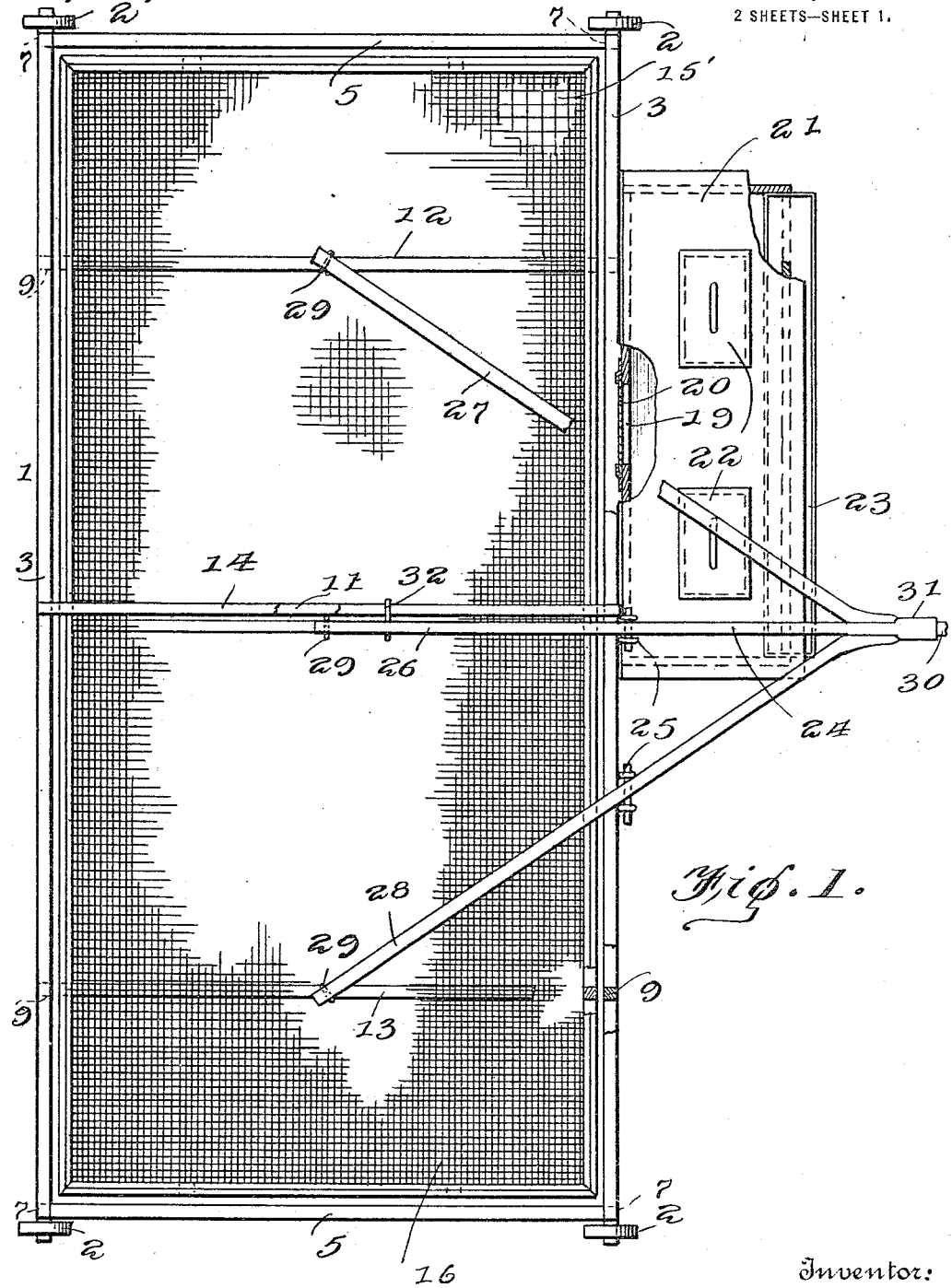
Figure 1 is a top plan view of the device, with parts appearing in section.

In the practical embodiment of my invention I provide a portable frame 1, preferably of rectangular or oblong rectangular form. In the present instance I have shown a frame of oblong rectangular form, provided at its corner portions with ground wheels or rollers 2 whereby it is adapted to be readily and conveniently drawn from place to place over the surface of the ground.

The frame is shown as comprising upper and lower longitudinal bars or rails 3 and 4, upper and lower end bars or rails 5 and 6, corner posts or bars 7 and end braces 8, the aforesaid parts being suitably united to form a frame of proper strength, rigidity and durability. Uprights 9 may be provided to connect the upper and lower sets of bars or rails, together with a front longitudinally extending intermediate bar 10. The upper front and rear longitudinal bars are also connected at intervals by intermediate bars 11, 12, and 13, arranged, respectively, at the center of the frame and between the center of the frame and the ends thereof. Above the central transverse bar 11 is arranged a supporting bar 14 supported from the upper longitudinal bar by other uprights 15, and which is provided for a purpose hereinafter described.

Inclosed within said frame is a vertically movable cage 16, consisting of a suitable framework over which is stretched a covering of woven wire or other suitable reticulated material. This cage 16 is designed to receive and form a grazing inclosure for the rabbits, and is inclosed at its bottom by a screen of wire or other suitable material so that when the cage is depressed a yard will be formed over the surface of the ground bounded by the cage, allowing the animals to freely graze while confining them against escape. It will be understood that the cage may be disposed over a plot of grass, the screen 15' allowing the rabbits to eat the grass, which will be accessible through, while preventing the rabbits from burrowing out and escaping.

The front wall of the cage is provided with a suitable opening 17 for the entrance and exit of the animals, and supported upon the lower front portion of the frame 1 is a rabbit house or inclosure 18 in which the animals are normally confined. The house 18 is suitably secured to the lower longitudinal bar 3 and intermediate bar 10 and adjacent bars of the frame 1, and is provided at its rear or inner side with an opening 19 at its rear or inner side with an opening 19 closed by a sliding door 20, which is kept in closed condition when it is necessary or desired to keep the animals confined within the house, and is open when the cage is depressed to allow the rabbits to pass freely between the cage and house through the doorways or openings 17 and 19.

The rabbit house 18 is supported by the frame at a proper elevation above the surface of the ground, and is preferably provided with a sloping top or roof 21 having an eaves projection beyond its front wall for the proper shedding of rain water. Suitable openings may be provided in its top or roof for the introduction and removal of the animals, and these openings are provided with removable closures 22. At the front of the house is arranged a longitudinally extending trough, 23, projecting partially into and partially outside of the house, and which is designed to receive water to provide a drinking trough.

Figure 2:
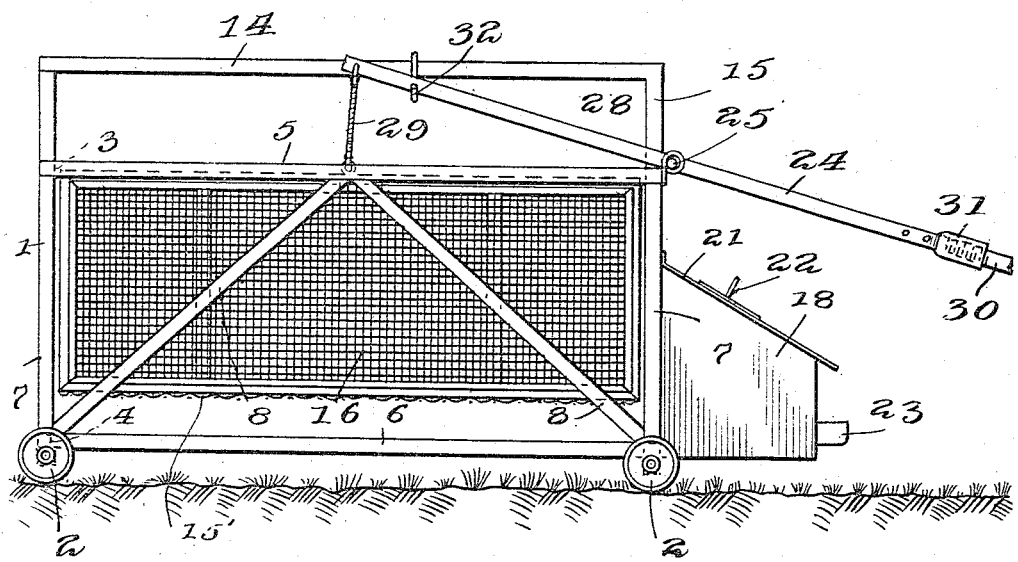
Fig. 2 is an end elevation of the same, showing the cage in elevated position.
Figure 3:
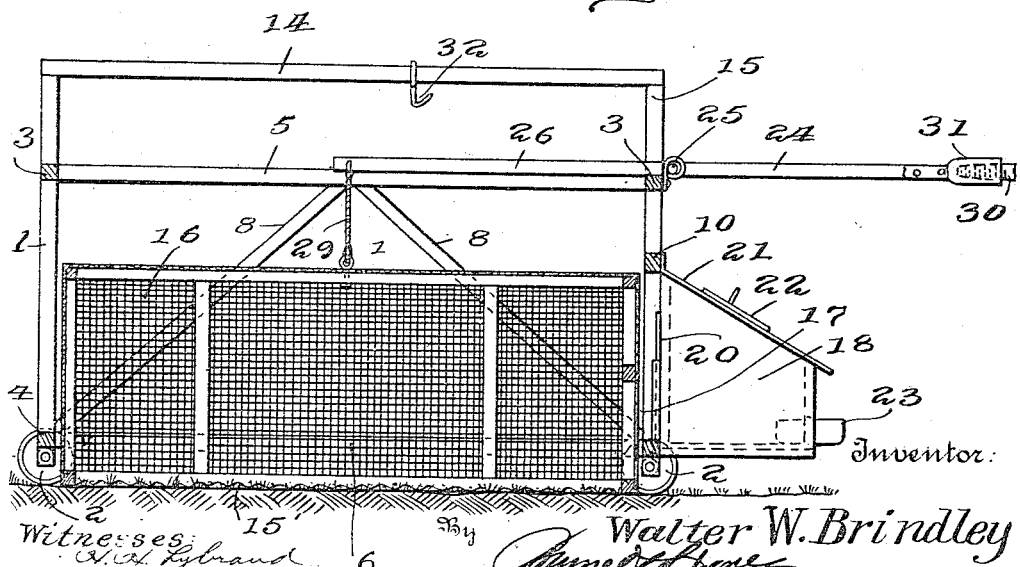
Fig. 3 is a central front to rear section, showing the cage lowered for use.

It will be seen that the rabbits may be confined within the house or inclosure 18 when desired, as in the transportation of the device from place to place, in inclement weather, or at such other times when it is necessary or desirable to keep them confined, but that whenever the cage 16 is lowered the opening 17 will register with the door way 19, so that upon the opening of the door 20 free communication between the grazing yard formed by the cage and the house will be established. For the purpose of raising and lowering the cage suitable raising and lowering mechanism is provided. This mechanism comprises a lever 24 pivotally mounted at the upper front part of the frame 1, as indicated at 25, to swing in a vertical plane and having three branching arms 22, 27 and 28 extending over upon the top of the frame above the central and end portions of the cage, said arms being connected at their inner ends by cords, cables or the like 29 with the cage, whereby when said arms are raised and lowered the cage will be raised and lowered therewith. The outer end or operating arm 30 of the lever extends over the rabbit house 18 at the front of the device and is provided with an adjustable counterweight 31, whereby the weight of the cage and its contents may be counterbalanced, allowing the cage to be raised with comparatively little effort or exertion on the part of the operator. Upon the bar 14 is provided a U-shaped catch 32 which may be engaged with the central arm 26 of the lever to support the lever and cage in a raised position, as shown in Fig. 2, thus holding the cage supported in its elevated position to permit the device to be pushed or drawn from place to place with ease and facility. The lever 24 may be employed as a handle or draft implement for pushing or drawing the device, or any other suitable form of draft element may be employed for the purpose.

It will thus be seen that my invention provides a portable carriage or frame which may be drawn over the grass from place to place, together with a closure in which the animals may be driven and confined while the device is being transported, and a closed cage which may be raised to allow the device to be transported and lowered to form a grazing cage or inclosure which is adapted to be brought into communication with the house and into which the animals may pass when it is desired to permit the same to eat the grass which is exposed through the screen 15'. It will also be seen that mechanism is provided whereby the cage may be raised and lowered in a ready and convenient manner and supported securely in raised position.

Having thus fully described my invention, I claim:

1. A device of the character described comprising a transportable frame, an animal house at one side of the frame having a door way at its side facing the space bounded by the frame, a door for closing said door way, a closed cage movably mounted in the frame, said cage being provided with a bottom of open work material and having a passage way adapted to register with the door way of the animal house when the cage is lowered, and means for raising and lowering the cage, said means being adapted to normally counterbalance the weight of the cage.

2. A device of the character described comprising an open work transportable frame, an animal house at one side of the frame having a doorway at its side facing the space bounded by the frame, a door for closing said door way, a closed cage movably mounted in the frame, said cage being inclosed at its bottom with a wire or other screen and provided with a passage way adapted to register with the door way of the animal house when the cage is lowered, a pivotally mounted lever upon the frame for raising and lowering the cage, and counterweight means upon said lever for counterbalancing the weight of the cage.

3. A device of the character described comprising an open work wheeled transportable frame, an animal house at the front of the frame and provided with a door way at its side facing the space bounded by the frame, a door for closing said door way, an inclosed cage mounted for vertical movement within the frame, said cage being provided with a screen at its base, and having a passage at its front for communication with the door way when the cage is in lowered position, a lever pivotally mounted at the front of the frame and having an operating end extending beyond the frame and provided with a central arm and side arms extending inwardly above the central and end portions of the cage, connections between said arms and the said portions of the cage, and means upon the frame for engagement with one of said arms to support the cage in an elevated position.

4. A device of the character described comprising a transportable frame, an animal house at one side of the frame having a door way at its side facing the space bounded by the frame, a door for closing said door way, a closed cage movably mounted in the frame, said cage having an open work bottom of screen material and provided with a passage way adapted to register with the door way of the animal house when the cage is lowered, a lever mechanism for raising and lowering the cage, and means associated therewith for counterbalancing the weight of the cage.

In testimony whereof I hereunto affix my signature in the presence of two witnesses.

WALTER WILLIAM BRINDLEY.

Witnesses:
W. W. BENEDICT,
H. G. SIMPSON.

Copies of this patent may be obtained for five cents each, by addressing the "Commissioner of Patents, Washington, D. C."